Sept. 23, 1969 B. T. SETCHELL 3,469,031

TELEVISION SET AND ELECTRONIC AIR CLEANER

Filed July 6, 1966 2 Sheets-Sheet 1

INVENTOR
BARTON T. SETCHELL

BY [signature]

ATTORNEY

INVENTOR
BARTON T. SETCHELL
BY Robert M. Dunning
ATTORNEY

1

3,469,031
TELEVISION SET AND ELECTRONIC AIR CLEANER
Barton T. Setchell, 5333 Matterhorn Circle, Minneapolis, Minn. 55421
Filed July 6, 1966, Ser. No. 563,152
Int. Cl. H01j 29/02
U.S. Cl. 178—7.9 8 Claims

ABSTRACT OF THE DISCLOSURE

A television cabinet is provided with air passageways to provide air circulation to disperse heat generated by the tubes and other comopnents. An electronic air filter is positioned at the air inlet of the cabinet, and acts to filter out dust particles from the incoming air. This filter is supplied with high voltage from the power transformer of the television set so that a single power supply may be used to actuate both the television receiver and the electronic filter.

This invention relates to an improvement in television set and air cleaner and deals particularly with an apparatus which includes a television receiving set and an air cleaner capable of cleaning the air circulated through the cabinet enclosing the set.

During recent years, electronic air cleaners have been produced capable of removing an extremely high percentage of general airborne dirt, as well as virtually all the pollen present in the air. The cleaner is also capable of trapping tiny particles of dirt, smoke and grease. The device usually includes a cell having a series of spaced plates of opposite polarity which are charged with high voltage. The various impurities collect on the plates and are removed from time to time to clean out the impurities which have been collected on the collector plates.

While these electronic cleaners are very effective, they are also relatively expensive. The cleaners usually include a cabinet which may be of a size similar to that used for a color television receiver set. The cabinet is usually provided with a fan or blower for circulating air through the cabinet, a high voltage transformer, and the necessary protective screens and filters. As a result, they are considered by many folks to be a luxury rather than a necessity.

Television sets, and particularly those designed for receiving color television, have certain of the same component parts. One of the most expensive components of such a receiving set is the high voltage transformer used for generating the high voltages required to operate the picture tube. Most color television sets are of the console type and accordingly include an attractive cabinet. These cabinets must be provided with some means for providing a circulation of air through the cabinet due to the heat generated by the component parts. Thus, a television set incorporates all of the component parts for operating an electronic air cleaner with the exception of the cleaning cell itself. By providing such an electronic cell in the path of air entering the cabinet, the same cabinet may be used to house both the television receiving set and the air cleaner.

Cabinets used for enclosing television sets are usually provided with openings in the bottom of the cabinet, and many such sets are provided with metal chassis members for supporting the component parts which are apertured

2 so that the air may pass upwardly around the vacuum tubes and around the body of the video tube. A screen of foraminous grille is usually provided near the top of the cabinet, most commonly at the rear thereof, through which the air may leave the cabinet. By positioning the air cleaning electronic cell in the path of the incoming or outgoing air, the cabinet and television components serve a dual purpose.

There is a definite advantage in combining an electronic air cleaner with a television receiving set. In a great many instances, such as while watching a football game, a baseball game, or other event or program which is of wide interest, several persons will sit about a room watching the program and smoke. As a result, the air becomes very polluted with smoke, particularly in cooler weather when the windows are at least partially closed. An electronic air cleaner serves one of its best functions at times of this sort, as it functions effectively to remove smoke particularly from the air. However, many rooms are not sufficiently large to accommodate both a console television set and a separate electronic air cleaner comfortably. By having both units enclosed in the same cabinet, the requirement for an entirely separate unit is obviated.

A further feature of the present invention lies in the fact that a single combined unit of the type described may be produced at a cost which does not greatly exceed the cost of the color television set alone. The circuit of such a set is such that conductors may be tapped into the television circuit, eliminating the resistors, capacitors and other components which are usually used in conjunction with a high voltage transformer producing the voltage for the air cleaner. The operation of the air cleaner does not affect the operation of the television set in any way.

These and other objects and novel features of the present invention will be more clearly and fully set forth in the following specifications and claims.

In the drawings forming a part of the specification FIGURE 1 is a rear elevational view of a color television console with the solid rear panel removed so that the interior of the cabinet may be viewed.

Figure 3:
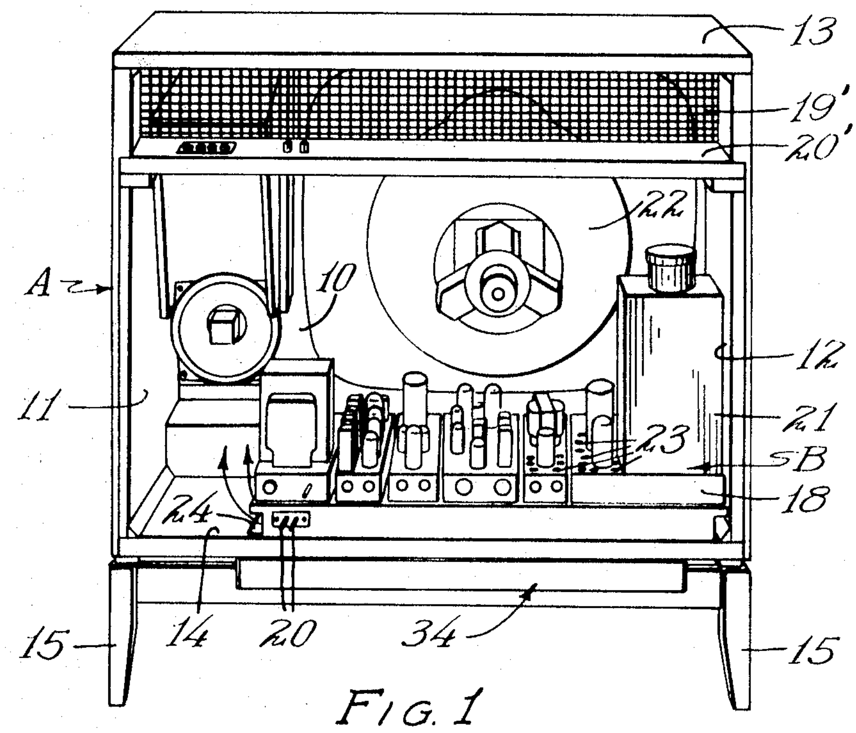
FIGURE 3 is a side elevational view of the cabinet shown in FIGURES 1 and 2, a portion of the cabinet being broken away to indicate the manner in which air may be circulated.

FIGURE 1 of the drawings illustrates a television receiving set for receiving color television including a front panel 10, side wall panels 11 and 12, a top panel 13 and a bottom panel 14. The cabinet, which is indicated in general by the letter A, is supported by legs 15 located at the corners of the cabinet. The cabinet is provided with a removable back panel 16 which is secured to the remainder of the cabinet by screws 17 or other suitable means. A circuit-breaking plug 19 is attached to the rear panel 16 and is normally engaged with plugs or prongs 20 on the chassis 18 of the television set B.

The specific television set illustrated is a Setchell-Carlson chassis Model U802 used in models 3C66, 3CM66, 3CL66, and 3L6600. Obviously, the specific type of television receiving set used is unimportant, but reference is made to these sets by means of example, as the schematic diagrams are available. In other words, reference to this particular style of set precludes the necessity of including the schematic diagram in the present application.

Figure 2:
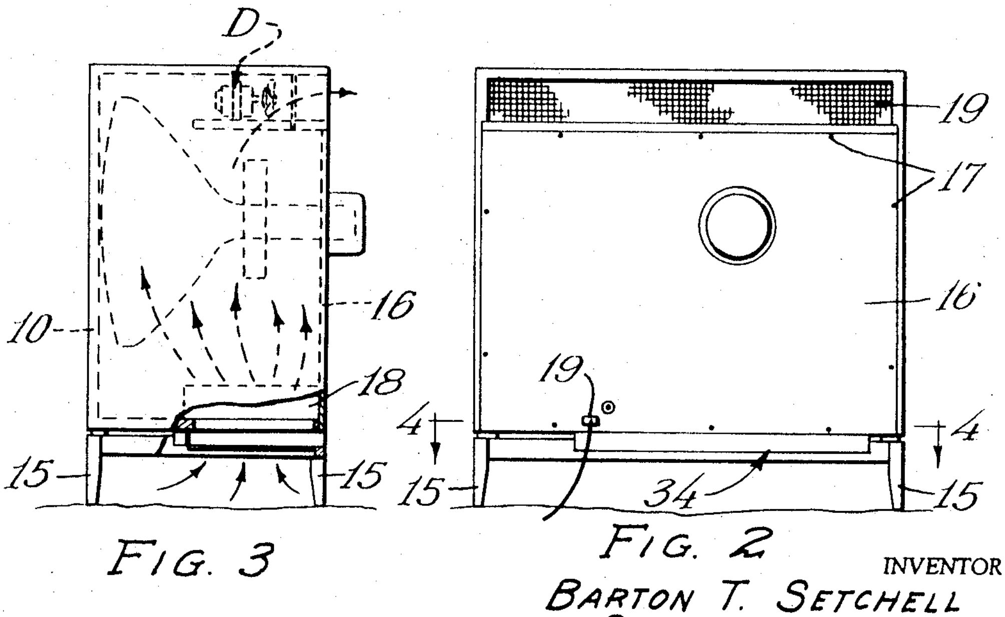
FIGURE 2 is a rear elevational view of the same cabinet with the rear panel in place.

As is also to be noted in FIGURES 1 and 2, the rear panel 16 terminates short of the top panel 13 of the set, and a screen or grille 19' is provided above the level of the rear panel 16. As is indicated in FIGURE 1, a shelf or ledge 20' extends between the sides 11 and 12 of the cabinet, and the space between this ledge 20 and the top panel 13 forms an opening normally closed by the screen or grille 19'.

Figure 4:
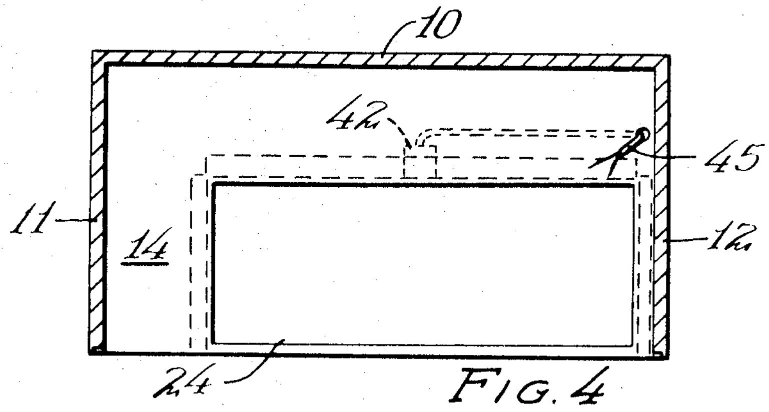
FIGURE 4 is a horizontal sectional view of the bottom panel of the cabinet and showing the air cleaning units supported there beneath, the position of the section being indicated by the line 4—4 of FIGURE 2.

The power supply of the television chassis B includes a high voltage transformer indicated at 21. This transformer supplies perhaps 25,000 volts to the picture tube 22, and lesser voltages to various other components of the chassis and the picture tube. Obviously, heat is generated by the high voltage transformer itself, as well as the picture tube and the various vacuum tubes and parts mounted on the chassis. The chassis 18 is accordingly provided with numerous apertures such as 23 extending therethrough to which air may flow. As indicated in FIGURE 4 of the drawings, the bottom panel 14 is provided with an aperture 24 therethrough over which portions of the chassis extend. As is indicated in FIGURE 1 of the drawings, the aperture 24 may extend beyond the television chassis so that air may also rise beyond the ends of the chassis itself.

Figure 5:
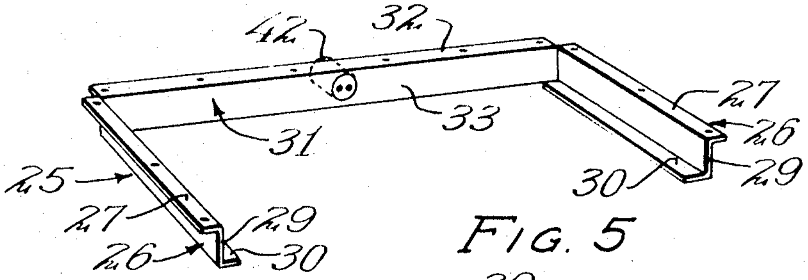
FIGURE 5 is a perspective view of the frame in which the air cleaning unit is supported.
Figure 6:
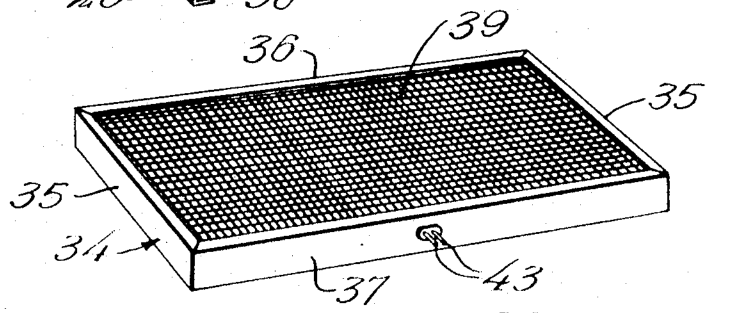
FIGURE 6 is a perspective view of the undersurface of the air cleaning unit showing the protective screen beneath the unit.

A three-sided frame 25, illustrated in FIGURE 5 of the drawings, is secured to the bottom panel 14 of the cabinet A, the frame encircling three sides of the aperture 24. The sides of the frame are substantially Z-shaped in cross-section, these sides 26 including an outwardly extending horizontal flange 27, a vertical flange 29 connected to the inner edge of the outwardly turned flange 27, and an inwardly turned horizontal flange 30 extending inwardly from the lower edge of the vertical member 29. The forward frame side 31 is of angular cross-section, including a horizontal flange 32 which is in coplanar relation with the horizontal flanges 27 of the sides 26 and a vertical flange 33 which is connected at opposite ends to the vertical flanges 29 of the sides 26. The horizontal flanges 27 and 32 are secured in face contact with the undersurface of the cabinet's bottom panel 14.

The frame 25 is designed to support the electronic air cleaning unit 34. The unit 34 includes channel-shaped opposed parallel sides 35, a channel-shaped panel 36, and a channel-shaped rear panel 37. A protective screen 39 extends across the undersurfaces of the channel-shaped sides and ends. The interior of the unit 34 includes a series of plates 40 arranged in spaced relation, and a series of plates 41 arranged in spaced relation. One series of plates is of one polarity and the other is of opposite polarity. As air containing impurities such as pollen, dust, dirt, smoke and grease particles, bacteria and spores passes the first set of plates, the particles in the air become ionized and are then collected on the second section of the electronic cell. From time to time the unit 34 is removed and washed by a suitable means.

As indicated, an electrical socket 42 is mounted upon the forward frame side 31 and is designed to receive the prongs 43 forming the male portion of the connector, As a result, the air cleaning cell is automatically disconnected from the surface when it is removed from the frame 25 in order to prevent injury.

Figure 7:
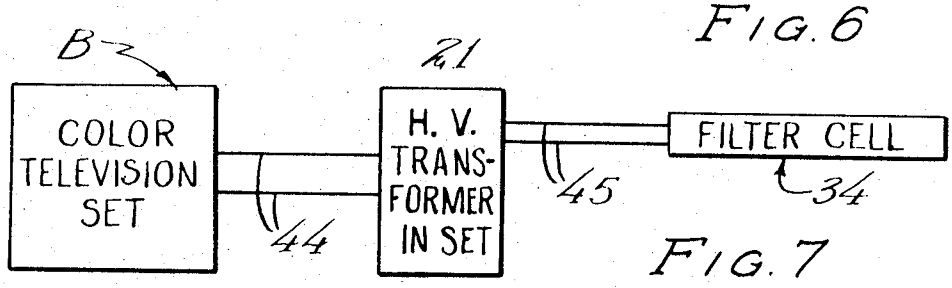
FIGURE 7 is a block diagram showing the manner in which the high voltage transformer of the television set is connected both to the color television set and the filter cell or electronic air cleaner.
Figure 8:
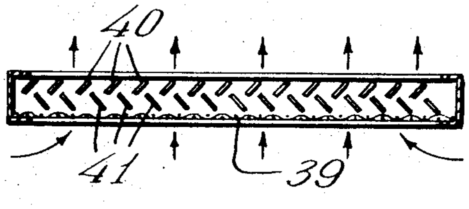
FIGURE 8 is a vertical sectional view through one form of electronic air cleaning cells.

FIGURE 7 of the drawings diagrammatically illustrates the high voltage transformer 21 connected to the color television set, and also to the air filter cell 34. The conductors 44 may deliver, for example, 5,000 volts while the conductors 45 may deliver 5,000 volts of direct current. As a convenient location for the taps connecting the air cleaning filter cell to the high voltage transformer 21, the filter cell may be connected between ground or the negative pole of the direct current and the focus voltage in the foregoing described schematic diagram. The focus voltage of the CRT picture tube is approximately 5,000 volts. In other specific wiring diagrams, different points of attachment may be provided.

As will be understood, the air cleaner acts in various capacities. It not only cleans the air circulated through the cabinet A, but also acts to prevent dust and dirt from collecting on the components of the television set. The circulation of air is usually created mainly by the heat given off by the components of the television receiver set B. If desired, however, a small fan or a blower D may be provided for increasing the speed of flow of air.

In accordance with the patent statutes, I have described the principles of construction and operation of my improvement in television set and air cleaner, and while I have endeavored to set forth the best embodiment thereof, I desire to have it understood that changes may be made within the scope of the following claims, without departing from the spirit of my invention.

I claim:

1. In combination:
a television receiving set,
a cabinet enclosing said receiving set,
said cabinet having an air inlet at the bottom thereof and an air outlet at the upper end thereof,
said television set including a high voltage transformer,
an electronic air cleaner supported in the path of air passing through said cabinet and including spaced plates of opposite polarity, and
means connecting said plates to said high voltage transformer.

2. The structure of claim 1 and in which the receiving set includes a chassis at least partially overlying said air inlet said chassis being apertured to permit a flow of air therethrough.

3. The structure of claim 1 and in which the cabinet includes an apertured bottom panel providing said air inlet, and including means supporting said air cleaner to a surface of said bottom panel adjoining the aperture in said panel.

4. The structure of claim 1 and including a circulating fan for assistance in circulating air through said cabinet.

5. A television receiving set including:
chassis means supporting components of said receiving set,
a high voltage transformer for supplying voltage to said television set,
a cabinet enclosing said television set, including the chassis and transformer,
said cabinet having front, rear, side, top and bottom walls,
said television set including a video tube visible through an aperture in said front wall,
said bottom wall having an aperture therethrough and said rear wall having an aperture therethrough through which heat generated by said components, said video tube, and said high voltage transformer may circulate, and
an electronic air cleaner cell having spaced plates of opposite polarity supported in the path of air passing through said cabinet,
said plates being connected to said high voltage transformer.

6. The structure of claim 5 and including frame means suspended beneath said bottom wall for removably supporting said air cleaner cell.

7. The structure of claim 5 and in which said chassis at least partially overlies said aperture in said bottom wall and is apertured to permit the flow of air therethrough.

8. The structure of claim 5 and including a fan for augmenting the circulation of air through said cabinet.

References Cited

UNITED STATES PATENTS

| | | | |
|---|---|---|---|
| 2,897,487 | 7/1959 | Owen | 178—7.8 |
| 3,164,838 | 1/1965 | Heinrich | 178—7.9 X |

OTHER REFERENCES

"Closed-Circuit Television Systems, Color and Monochrome," Government Service Department, RCA Service Company, p. 93.

ROBERT L. GRIFFIN, Primary Examiner

R. K. ECKERT, Jr., Assistant Examiner

U.S. Cl. X.R.

55—101, 126, 136, 139, 140, 385, 481